Nov. 25, 1947.                E. E. MOYER ET AL                2,431,578
       ELECTRIC VALVE CONTROL FOR DYNAMOELECTRIC MACHINES
                       Filed March 28, 1946

Inventors:
Elmo E. Moyer,
Donald Eldred,
by Clark H. Nitt.
Their Attorney.

Patented Nov. 25, 1947

2,431,578

UNITED STATES PATENT OFFICE 2,431,578

ELECTRIC VALVE CONTROL FOR DYNAMO-ELECTRIC MACHINES

Elmo E. Moyer, Scotia, and Donald Eldred, Schenectady, N. Y., assignors to General Electric Company, a corporation of New York Application March 28, 1946, Serial No. 657,879

2 Claims. (Cl. 318—297)

This invention relates to control systems, more particularly to systems for controlling the operations of electric motors, and it has for an object the provision of a simple, reliable, efficient and inexpensive control system of this character.

More particularly, the invention relates to motor control systems in which a reversible direct current motor is supplied by suitable electric valve apparatus from a source of alternating voltage, and a more specific object of the invention is the provision of a control system in which the magnitude and direction of rotation of the motor is controlled in response to changes in the magnitude of a signal voltage.

In carrying the invention into effect in one form thereof, the armature of a reversible motor is connected to a source of alternating voltage through a pair of half wave rectifying valves. One of these valves supplies half wave current impulses to the motor for rotation in one direction and the other furnishes half wave current impulses for rotation in the opposite direction. The amount of current supplied by each of these rectifier valves is controlled by means of an individual capacitor. Two pair of control valves, one pair for each of the capacitors, are provided for varying the charges on the capacitors. One of each pair of the control valves is a grid controlled valve. The grid of one of these grid controlled valves is connected to a source of adjustable voltage. A signal voltage is supplied to the grid of the other grid controlled valve. The cathodes of the two grid controlled valves are connected together and through a common resistor to one side of the alternating voltage source. An increase of the signal voltage above a predetermined value has the effect of increasing the conductivity of one of the grid control valves, thereby to increase the current conducted by one of the rectifier valves. Correspondingly, a decrease of the signal voltage below this predetermined value decreases the conductivity of the first grid controlled valve and increases the conductivity of the second grid controlled valve to increase the current conducted by the other rectifier valve.

Figure 1:
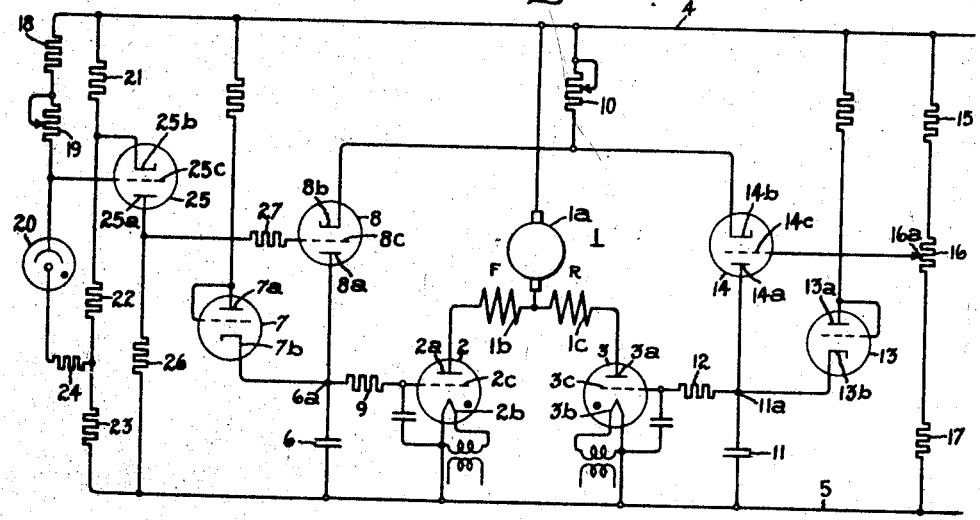
Figure 2:
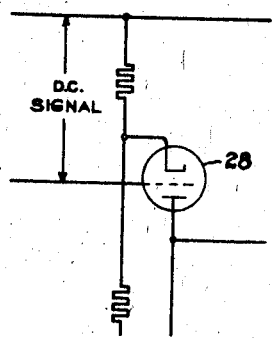

For a better and more complete understanding of the invention, reference should now be had to the following specification and to the accompanying drawing of which Fig. 1 is a simple, diagrammatical illustration of an embodiment of the invention, and Fig. 2 is a detail of a modification.

Referring now to the drawing, the armature 1a of a reversible direct current motor 1 is connected in circuit with the anode-cathode conducting path of a pair of rectifier electric valves 2 and 3 across the supply conductors 4 and 5. These supply conductors may be energized with alternating voltage of a suitable value, e. g. 230 volts.

The motor 1 is illustrated as a series motor having a split series field winding comprising two opposing coils 1b and 1c. It may be assumed that energization of the coil 1b effects rotation in the forward direction and that energization of the coil 1c effects rotation in the reverse direction.

Although electric valves 2 and 3 may be of any suitable type, they are preferably of the triode type having an anode, a cathode, and a control grid, and having a small quantity of a gas, such as mercury vapor or argon within the envelope. The presence of this gas converts the usual pure electronic discharge into an arc stream, so that the valve becomes a grid controlled arc rectifier. The grid has control only of the starting of the discharge. However, by varying the firing point, i. e. the time in the positive half cycle of the anode voltage at which the grid voltage attains the critical value necessary to initiate current flow in the anode-cathode circuit, the average value of the current which flows in the output circuit can be varied. If the firing point occurs at or near the beginning of the positive half cycle of the anode voltage, maximum current will flow in the output circuit. If the firing point occurs between the 90 degree and 180 degree point, the current flow will be a minimum or zero. For intermediate firing points the output will have corresponding intermediate values.

As shown in the drawing, the upper terminal of the armature 1a is connected to the supply conductor 4 and the lower terminal is connected to the junction point of the two field windings 1b and 1c. The free terminals of the field coils 1b and 1c are connected to the anodes 2a and 3a respectively of the rectifier valves 2 and 3 of which the cathodes 2b and 3b respectively are connected to the supply conductor 5.

For the purpose of controlling the firing point of the valve 2, a capacitor 6 is provided together with a pair of control electric valves 7 and 8. One terminal of the capacitor 6 is connected to the supply conductor 5 and the other terminal 6a is connected through a protective resistor 9 to the grid 2c. The terminal 6a is also connected through valve 7 and a series resistor to the opposite supply conductor 4. Thus, the capacitor 6 is connected across the cathode 2b and the grid 2c of valve 2 so that any voltage which exists across the capacitor is applied between the cathode 2b and grid 2c.

Preferably the valve 7 is a diode valve having an anode 7a and a cathode 7b. As shown in the drawing, a triode valve having its grid connected to the anode may be employed to provide diode operation. The valve 8 is a controlled valve having an anode 8a, a cathode 8b and a control grid 8c. This valve is connected in a circuit which extends from the supply conductor 5 through capacitor 6, anode-cathode circuit of valve 8 and adjustable resistor 10 to the supply conductor 4. It is thus connected in parallel with the diode valve 7 and is reversely connected with respect thereto, i. e. its anode 8a is connected to the cathode 7b of valve 7 and its cathode 8b is connected through the resistor 10 to the supply conductor 4 to which the anode 7a of valve 7 is connected.

Owing to the reverse connection of the two valves 7 and 8, both halves of the alternating voltage wave of the supply conductors 4, 5 are applied to capacitor 6 and thus the capacitor is alternately charged with voltages of opposite polarity. During the half cycle in which the valve 7 conducts, the voltage of the terminal 6a tends to become positive and during the succeeding half cycle in which the valve 8 conducts, the capacitor tends to discharge and to become recharged to the opposite polarity so that the terminal 6a tends to become negative. If the valves 7 and 8 conduct equally, the voltage across the capacitor 6 is an alternating voltage having no direct current component. This alternating voltage will lag the anode voltage of the valve 2 by approximately 90 degrees if the reactance of the capacitor 6 is small compared to the equivalent resistance of the valves 7 and 8. However, if the amounts of current conducted by the two reversely connected control valves are unequal, the alternating voltage across the capacitor 6 will have a direct current component, the polarity of which depends upon which of the two oppositely poled currents tends to be the greater and the magnitude of which depends upon the difference in the amounts of the two currents. Thus, if the valve 7 conducts, in effect, more current than valve 8, the polarity of the net direct current component across the capacitor 6 will be such that the terminal 6a becomes positive with respect to the voltage of the supply conductor 5. Conversely, if the valve 8 conducts more current than valve 7 conducts, the voltage of the terminal 6a becomes negative with respect to the supply conductor 5. Since the grid 2c of the valve 2 is connected to the terminal 6a, the effect of varying the direct current component of the voltage across the capacitor 6 is to vary the firing point of the valve 2. Thus, as the direct current component increases in a direction to make the terminal 6a more positive, the firing point of valve 2 is advanced and the amount of current supplied by valve 2 to the armature and field coil 1b is correspondingly increased. Conversely, as the direct current component is varied in a direction to make the terminal 6a less positive, the firing point of valve 2 is retarded and the amount of current supplied to the armature and field coil is correspondingly decreased.

Similarly a capacitor 11 is connected between the cathode 3b and grid 3c of valve 3. A protective resistor 12 is connected between the grid and the terminal 11a of the capacitor. For the purpose of controlling the charge on the capacitor 11, a pair of inversely connected control valves 13 and 14 are provided. As shown, the valve 13 is a triode valve with its grid connected to the anode to provide diode operation, and the valve 14 is a controlled valve having an anode 14a, a cathode 14b, and a control grid 14c. The anode 14a of valve 14 and the cathode 13b of valve 13 are connected together to the terminal 11a of the capacitor. The control valves 13 and 14 function to control the charge on the capacitor 11 and thus to control the firing point of the valve 3 in the same manner that the valves 7 and 8 control the firing point of the valve 2 as explained in the foregoing.

The cathode 14b of control valve 14 is connected to the cathode 8b of control valve 8 and through the common adjustable resistor 10 to the supply conductor 4, and the control grid 14c is connected to a point of adjustable voltage. For this purpose a voltage divider comprising the resistors 15, 16 and 17 is connected across the supply conductors 4 and 5 and the grid 14c is connected to the slider 16a of the adjustable resistor 16.

For the purpose of controlling the valve 8 a signal voltage is derived from the voltage drop across the resistors 18 and 19 with which a variable control device such as the photo-electric cell 20 is connected in circuit. As shown, a plurality of resistors 21, 22 and 23 are connected across the supply conductors 4, 5 and the anode of the photo-electric cell 20 is connected through a resistor 24 to the junction point of the resistors 22 and 23. The signal voltage which appears across the resistors 18 and 19 is amplified by means of the electric valve 25 of which the anode 25a is connected through a resistor 26 to the supply conductor 5 and the cathode 25b is connected to the junction point of the resistors 21 and 22. The grid 25c of valve 25 is connected to the cathode of the photo-electric cell 20. Thus, the difference between the voltage drop across the resistor 21 and the signal voltage across the resistors 18 and 19 is applied between the cathode 25b and grid 25c of valve 25.

The initial grid bias of valve 25 is so adjusted that with a predetermined amount of light falling upon the photo-electric cell 20 the signal voltage drop across resistors 18 and 19 is such that the valve 25 is conducting approximately in mid range.

The grid 8c of the control valve 8 is connected to the anode 25a of the amplifier valve through a suitable protective resistor 27 so that the grid to cathode voltage of valve 8 is made to depend upon the voltage difference between the voltage drop across the resistor 10 and the drops across resistor 21 and valve 25.

Initially, the grid biases of the valves 8 and 14 are so adjusted that with the valve 25 conducting in mid range, the valves 8 and 14 are also conducting at such a point in their useful ranges that the firing points of the valves 2 and 3 are retarded beyond the 90 degree point. This results in minimum or zero current being supplied by the valves 2 and 3 to the armature of the motor 1a and the motor is at rest.

With the foregoing understanding of the elements and their organization, the operation of the system will be readily understood from the following detailed description:

If the light falling upon the cathode of the photo-electric cell increases, the conductivity of the cell is increased thereby increasing the voltage drop across the resistors 18 and 19. As a result, the voltage of the grid 25c is made less negative with respect to the voltage of the cathode 25b and the conductivity of the valve 25 is correspondingly increased. The increased conductivity of valve 25 produces an increased voltage drop across the resistor 26 thereby to make the voltage of the grid 8c of valve 8 increasingly negative with respect to the voltage of its cathode. This results in decreasing the conductivity of the valve 8 with respect to the conductivity of the valve 7 so that in effect more charging current is supplied to the capacitor 6 by the valve 7 than is supplied by the valve 8. Consequently, there appears across the capacitor 6 a component of direct voltage of which the polarity is positive at the terminal 6a. This component of direct voltage advances the firing point of the valve 2 thereby rendering the valve conductive and causing voltage impulses to be supplied to the armature 1a and field coil 1b of the motor during those half cycles of supply voltage in which the voltage of the supply conductor 4 is positive.

The decreased conductivity of valve 8 reduces the voltage drop across the common cathode resistor 10 with the result that the voltage of the cathode 14b is correspondingly reduced, i. e., made increasingly negative with respect to the voltage of the grid 14c. The decreased voltage drop across the resistor 10 also makes the voltage of the cathode 8b increasingly negative with respect to the voltage of grid 8c. However, since the voltage of the grid 14c remains constant, the conductivity of valve 14 increases while the conductivity of valve 8 decreases. The net result is that the conductivity of the valve 14 is increased approximately to the same extent that the conductivity of the valve 8 is decreased.

Since the conductivity of valve 13 remains constant while the conductivity of valve 14 is increasing, more charging current is supplied by the valve 14 to the capacitor 11 than is supplied by the valve 13. Consequently, there appears across the capacitor 11 a direct current component voltage of which the polarity at the terminal 11a is negative. This results in retarding the firing point of the valve 3. However, since the valve 3 is substantially at cut-off, this retardation of the firing point of valve 3 at this time has little or no effect upon the operation of the motor.

If the amount of light falling on the cathode of the photo-electric cell 20 is further increased, the firing point of the valve 2 is correspondingly advanced and the amount of current supplied to the armature 1a and field coil 1b of the motor is correspondingly increased. Similarly, if the amount of light falling on the cathode of the cell 20 is decreased, the firing point of the valve 2 is retarded and the amount of current supplied to the motor 1 by the valve 2 is correspondingly decreased.

If the light falling on the cathode of the photo-electric cell is decreased to such an extent that the signal voltage drop across the resistors 18 and 19 falls below the predetermined value, the conductivity of valve 8 with respect to valve 7 is increased and consequently the valve 8 supplies more charging current to the capacitor 6 than does the valve 7. This produces a reversal of the polarity of the component direct voltage across the capacitor 6, i. e. the polarity is such that the voltage of the terminal 6a becomes negative thereby retarding the firing point of the valve 2 to cut-off or below.

In addition, the increased conductivity of the valve 8 produces an increased voltage drop across the common cathode resistor 10 thereby making the voltage of the cathode 8b more positive with respect to the voltage of the grid 8c. Simultaneously, the increased voltage drop across the cathode resistor 10 renders the voltage of the cathode 14b increasingly positive with respect to the voltage of the grid 14c. This correspondingly decreases the conductivity of the valve 14 because the voltage of the grid 14c remains constant. Consequently, the conductivity of the valve 14 is decreased by approximately the same amount that the conductivity of the valve 8 is increased.

As a result of the decreased conductivity of the valve 14, the polarity of the direct component voltage across the capacitor 11 becomes more positive at the terminal 11a thereby advancing the firing point of the valve 3. This causes current to be supplied to the armature and series field coil 1c thereby effecting rotation of the motor in a reverse direction.

Further decreases in the amount of light falling upon the cathode in the photo-electric cell 20 effects corresponding advances in the firing point of valve 3 and corresponding increases in the speed of the motor in that direction.

From the foregoing it is seen that the valve 8 cooperates with the valve 7 to vary the firing point of valve 2 and, similarly, that the valve 14 cooperates with the valve 13 to vary the firing point of the valve 3. In addition, the valves 8 and 14 serve as switching valves to switch the control between the valves 2 and 3 and thereby determine the direction of rotation of the motor in accordance with the magnitude of the signal voltage across the resistors 18 and 19.

It is not essential that a photo-electric cell be utilized to produce a signal voltage for operation of the system. As shown in Fig. 2, any voltage corresponding to a predetermined quantity may be utilized as a signal voltage and impressed between the cathode and grid of the valve 28 which corresponds to the first stage amplifier valve 25 of Fig. 1.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A control system for a dynamoelectric machine comprising a pair of alternating voltage supply conductors, means for controlling the magnitude and polarity of the excitation of said machine comprising a first pair of electric valves each provided with an anode, a cathode and a control grid, means for supplying a voltage having a periodically varying component and a direct component to the grids of said valves comprising a first capacitor connected between the grid and cathode of one of said valves and a pair of reversely connected electric valves connected in circuit with said capacitor across said supply conductors, a second capacitor connected between the grid and cathode of the other of said first pair of valves and a pair of reversely connected electric valves connected in circuit with said second capacitor across said supply conductors, one of each of said pairs of reversely connected valves being a triode valve having an anode, a cathode and control grid, means for supplying a bias voltage between the grid and cathode of one of said triode valves, means for supplying a signal voltage between the grid and cathode of the other of said triode valves, and a resistor common to both said triode valves and connected between the triodes thereof and one of said supply conductors for effecting operation of said triode valves as reversing switching valves to advance the firing point of one of said first pair of valves and to retard the firing point of the other of said first pair of valves.

2. A control system for a dynamoelectric machine provided with a pair of opposed field windings comprising a pair of alternating voltage supply conductors, means for controlling the magnitude and polarity of the excitation of said machine comprising a first pair of electric valves each connected in circuit with a corresponding one of said windings and each provided with an anode, a cathode and a control grid, means for supplying a voltage having a direct component and a periodically varying component to the grids of said valves comprising a first capacitor connected between the grid and cathode of one of said valves and a pair of reversely connected electric valves connected in circuit with said capacitor across said supply conductors, a second capacitor connected between the grid and cathode of the other of said first pair of valves and a pair of reversely connected electric valves connected in circuit with said second capacitor across said supply conductors, one of each of said reversely connected pairs of valves being a triode valve provided with an anode, a cathode and a control grid, means for supplying a bias voltage to the grid of one of said triode valves, means for supplying to the grid of the other of said triode valves a variable signal voltage having valves greater and less than a predetermined value and a resistor common to both said triode valves and connected between the cathode thereof and one of said supply conductors for effecting operation of said triode valves as reversing switching valve for selectively controlling the firing points of said first pair of valves to effect selective energization of said field windings in response to the magnitude of said signal voltage.

ELMO E. MOYER.
DONALD ELDRED.